(12) United States Patent
Aoki et al.

(10) Patent No.: US 8,224,846 B2
(45) Date of Patent: Jul. 17, 2012

(54) APPARATUS FOR MUSIC RETRIEVAL, METHOD FOR MUSIC RETRIEVAL, AND PROGRAM FOR MUSIC RETRIEVAL

(75) Inventors: Keiko Aoki, Saitama-ken (JP); Keiichiro Hoashi, Saitama-ken (JP); Hiromasa Yanagihara, Saitama-ken (JP)

(73) Assignee: KDDI Corporation, Tokyo (JP)

( * ) Notice: Subject to any disclaimer, the term of this patent is extended or adjusted under 35 U.S.C. 154(b) by 322 days.

(21) Appl. No.: 12/433,367

(22) Filed: Apr. 30, 2009

(65) Prior Publication Data

US 2010/0082616 A1      Apr. 1, 2010

(30) Foreign Application Priority Data

Sep. 30, 2008   (JP) ................................. 2008-254451

(51) Int. Cl.
  *G06F 17/30* (2006.01)
(52) U.S. Cl. ...................................................... 707/772
(58) Field of Classification Search .................... 707/772
  See application file for complete search history.

(56) References Cited

U.S. PATENT DOCUMENTS

| | | | | |
|---|---|---|---|---|
| 5,941,711 | A * | 8/1999 | Iida et al. ................... | 434/307 A |
| 7,072,846 | B1 * | 7/2006 | Robinson ...................... | 705/7.32 |
| 2002/0002899 | A1 * | 1/2002 | Gjerdingen et al. ............ | 84/667 |
| 2002/0049631 | A1 * | 4/2002 | Williams ........................ | 705/14 |
| 2002/0143565 | A1 * | 10/2002 | Headings et al. ................. | 705/1 |
| 2003/0191753 | A1 * | 10/2003 | Hoch ................................ | 707/3 |
| 2003/0208586 | A1 * | 11/2003 | Mastronardi et al. .......... | 709/223 |
| 2004/0177115 | A1 * | 9/2004 | Hollander et al. ............. | 709/203 |
| 2005/0246377 | A1 * | 11/2005 | Faso ............................ | 707/104.1 |
| 2006/0153020 | A1 * | 7/2006 | Johnson et al. ............. | 369/30.06 |
| 2006/0190464 | A1 * | 8/2006 | Yamamoto ..................... | 707/100 |
| 2006/0239131 | A1 * | 10/2006 | Nathan et al. ............... | 369/30.06 |
| 2007/0163425 | A1 * | 7/2007 | Tsui et al. ........................ | 84/609 |
| 2009/0177652 | A1 * | 7/2009 | Markham ......................... | 707/5 |

FOREIGN PATENT DOCUMENTS

| | | |
|---|---|---|
| JP | 2003-99462 | 4/2003 |
| JP | 2005-010771 | 1/2005 |
| JP | 2005-018205 | 1/2005 |
| JP | 2005-032409 | 2/2005 |
| JP | 2005-077865 | 3/2005 |
| JP | 2007-114798 | 5/2007 |
| JP | 2007-233812 | 9/2007 |

* cited by examiner

*Primary Examiner* — James Trujillo
*Assistant Examiner* — William Spieler
(74) *Attorney, Agent, or Firm* — BainwoodHuang (57) ABSTRACT

An apparatus for retrieving music that matches with a user preference across a plurality of music is provided. The apparatus comprises a feature vector generating device for generating feature vectors of each of the music, a clustering device for clustering the music into a plurality of clusters according to the feature vectors, a music extraction device for extracting a predetermined number of music from each of the clusters, a music selection accepting device for accepting a selection of music by the user from the music, and a music retrieval device for calculating similarities between a feature vector of the selected music and feature vectors of each of the music, and retrieving music that have higher similarities to the selected music among the music.

25 Claims, 7 Drawing Sheets

(Music Retrieval Processing)

| No. | Music ID | Title | Artist | Play | Purchase | Search |
|---|---|---|---|---|---|---|
| 1 | 10593 | Title1 | Artist1 | ▶ | ¥ | Retrieve |
| 2 | 7304 | Title2 | Artist2 | ▶ | ¥ | Retrieve |
| 3 | 11708 | Title3 | Artist3 | ▶ | ¥ | Retrieve |
| 4 | 4545 | Title4 | Artist4 | ▶ | ¥ | Retrieve |
| 5 | 14248 | Title5 | Artist5 | ▶ | ¥ | Retrieve |
| 6 | 12055 | Title6 | Artist6 | ▶ | ¥ | Retrieve |
| 7 | 10739 | Title7 | Artist7 | ▶ | ¥ | Retrieve |
| 8 | 3635 | Title8 | Artist8 | ▶ | ¥ | Retrieve |
| 9 | 12050 | Title9 | Artist9 | ▶ | ¥ | Retrieve |
| 10 | 6054 | Title10 | Artist10 | ▶ | ¥ | Retrieve |
| 11 | 9294 | Title11 | Artist11 | ▶ | ¥ | Retrieve |
| 12 | 14585 | Title12 | Artist12 | ▶ | ¥ | Retrieve |
| 13 | 13964 | Title13 | Artist13 | ▶ | ¥ | Retrieve |
| 14 | 8868 | Title14 | Artist14 | ▶ | ¥ | Retrieve |
| 15 | 8449 | Title15 | Artist15 | ▶ | ¥ | Retrieve |
| 16 | 11501 | Title16 | Artist16 | ▶ | ¥ | Retrieve |
| 17 | 11918 | Title17 | Artist17 | ▶ | ¥ | Retrieve |
| 18 | 11657 | Title18 | Artist18 | ▶ | ¥ | Retrieve |
| 19 | 12057 | Title19 | Artist19 | ▶ | ¥ | Retrieve |
| 20 | 8845 | Title20 | Artist20 | ▶ | ¥ | Retrieve |

B1　B2　B3

Retrieve Again

| No. | Music ID | Title | Artist | Play | Purchase | Search |
|---|---|---|---|---|---|---|
| 1 | 10593 | Title1 | Artist1 | ▶ | ¥ | Retrieve |
| 2 | 10589 | Title21 | Artist21 | ▶ | ¥ | Retrieve |
| 3 | 10596 | Title22 | Artist22 | ▶ | ¥ | Retrieve |
| 4 | 10595 | Title23 | Artist23 | ▶ | ¥ | Retrieve |
| 5 | 6642 | Title24 | Artist24 | ▶ | ¥ | Retrieve |
| 6 | 6644 | Title25 | Artist25 | ▶ | ¥ | Retrieve |
| 7 | 2181 | Title26 | Artist26 | ▶ | ¥ | Retrieve |
| 8 | 4820 | Title27 | Artist27 | ▶ | ¥ | Retrieve |
| 9 | 3004 | Title28 | Artist28 | ▶ | ¥ | Retrieve |
| 10 | 6643 | Title29 | Artist29 | ▶ | ¥ | Retrieve |
| 11 | 10594 | Title30 | Artist30 | ▶ | ¥ | Retrieve |
| 12 | 5065 | Title31 | Artist31 | ▶ | ¥ | Retrieve |
| 13 | 5528 | Title32 | Artist32 | ▶ | ¥ | Retrieve |
| 14 | 2860 | Title33 | Artist33 | ▶ | ¥ | Retrieve |
| 15 | 5576 | Title34 | Artist34 | ▶ | ¥ | Retrieve |
| 16 | 1688 | Title35 | Artist35 | ▶ | ¥ | Retrieve |
| 17 | 7472 | Title36 | Artist36 | ▶ | ¥ | Retrieve |
| 18 | 4952 | Title37 | Artist37 | ▶ | ¥ | Retrieve |
| 19 | 13569 | Title38 | Artist38 | ▶ | ¥ | Retrieve |
| 20 | 4523 | Title39 | Artist39 | ▶ | ¥ | Retrieve |

B1　　B2　　B3

B4 Retrieve Again

APPARATUS FOR MUSIC RETRIEVAL, METHOD FOR MUSIC RETRIEVAL, AND PROGRAM FOR MUSIC RETRIEVAL

TECHNICAL FIELD

The present invention relates to an apparatus for music retrieval, a method of music retrieval, and a program for music retrieval.

BACKGROUND ART

Until now, various techniques for music retrieval have been proposed for retrieving music that match with user preferences across a plurality of music. For example, Patent Literature 1 proposes a technique for music retrieval which utilizes feeling vectors representing a user's impression on music and the related feature vector representing the musical characteristics of that music. Patent Literature 2 proposes another technique for music retrieval using impression features that quantify user's impressions on music. Patent Literature 3 proposes a technique for music retrieval that employs preference information indicating a user's preference for any given music, feature quantities of that music, and how many times the music has been played.

Patent Literature 4 proposes a technique for music retrieval that employs music parameters that quantify features of music as one or more factors. Patent Literature 5 proposes a technique for music retrieval utilizing feature quantities of the frequency spectrum of music. Patent Literature 6 proposes a technique for music retrieval using numerical values that represent user's subjective requirements on music. Patent Literature 7 proposes a technique for music retrieval utilizing user profiles that represent musical preferences of a user.

SUMMARY OF INVENTION

Technical Problem

However, with regard to conventional techniques for music retrieval as those described above, a user must be fully aware of titles, impressions, and the preference of music the user wishes to retrieve for before commencing any retrieval. The need therefore exists for an ability to retrieve music that match with the user preference even when the user is not fully aware of titles, impressions, and the like of music the user wishes to retrieve.

The present invention was conceived in light of the above-described problems, and an object thereof is to provide an apparatus for music retrieval, a method of music retrieval, and a program for music retrieval that are able to retrieve music that match with the user preference even when the user is not fully aware of which music should be retrieved.

Solution to Problem

Figure 2:
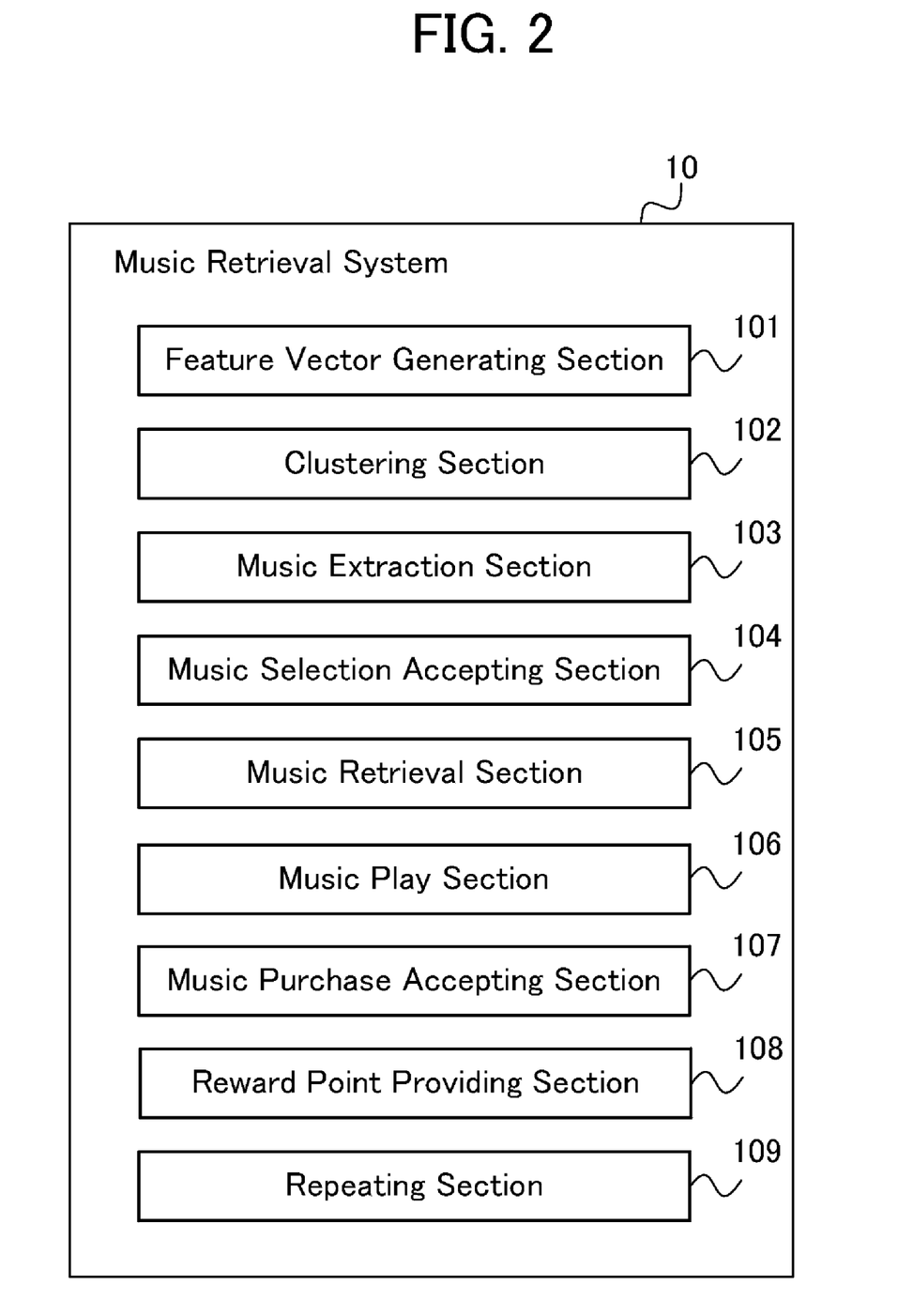
FIG. 2 is a block diagram illustrating a structure of a music retrieval apparatus according to an embodiment of the present invention.

In order to solve above-described problems, the present invention proposes the followings aspect:

A first aspect of the present invention proposes an apparatus for retrieving music that matches with a preference of a user across a plurality of music (which, for example, corresponds to a music retrieval apparatus 10 shown in FIG. 2), comprising: a feature vector generating device for generating feature vectors of said respective plurality of music (which, for example, corresponds to a feature vector generating section 101 shown in FIG. 2); a clustering device for clustering said plurality of music into a plurality of clusters according to the feature vectors generated by said feature vector generating device (which, for example, corresponds to a clustering section 102 shown in FIG. 2); a music extraction device for extracting a predetermined number of music from each of said plurality of clusters (which, for example, corresponds to a music extraction section 103 shown in FIG. 2); a music selection accepting device for accepting a selection of music by the user from the music extracted by said music extraction device (which, for example, corresponds to a music selection accepting section 104 shown in FIG. 2); and a music retrieval device for calculating similarities between a feature vector of the music selected, the selection of which is accepted by said music selection accepting device and feature vectors of said respective plurality of music, and retrieving music that have higher similarities to said selected music among said plurality of music (which, for example, corresponds to a music retrieval section 105 shown in FIG. 2).

According to this invention, the apparatus for retrieving music generates, by the feature vector generating device, feature vectors for each of the plurality of music, and clusters, by the clustering device, the plurality of music into a plurality of clusters according to the feature vectors generated by feature vector generating device. Then, a predetermined number of music is extracted from each of the plurality of clusters by the music extraction device, and a selection of music by the user from the music extracted by the music extraction device is accepted by the music selection accepting device. Furthermore, by the music retrieval device, similarities between a feature vector of the music selected, the selection of which is accepted by the music selection accepting device and feature vectors for each of the plurality of music are calculated, and music that have higher similarities to the selected music are retrieved among the plurality of music.

In other words, the plurality of music are clustered into a plurality of clusters according to their feature vectors, the predetermined number of music are extracted from each cluster, and the user is prompted to select music from the music that are extracted. Then, music having feature vectors having higher similarities to the feature vector of the music selected by the user are retrieved.

Accordingly, notwithstanding whether the user is fully aware of which music should be retrieved or not, by selecting music from the music that are extracted, the user can retrieve music having higher similarities to the selected music. Thus, even when the user is not fully aware of which music should be retrieved, he or she can make a music retrieval.

In addition, since the user selects music from the music extracted from various different clusters, the user can choose music to be used for a retrieval from a wide variety of music independent of exiting genres. Thus, music that match with the user preference can be identified. Furthermore, since titles of music, names of artists, names of genres, or the like to be retrieved are not required when retrieving, the user can retrieve titles or artists that the user does not know, or can make a retrieval from unexpected genres.

As described above, even when the user is not fully aware of which music should be retrieved, music that match with the user preference can be retrieved.

A second aspect of the present invention proposes the apparatus for retrieving music according to the first aspect, further comprising a music playing device for playing the music extracted by said music extraction device (which, for example, corresponds to a music play section 106 shown in FIG. 2).

According to this invention, the apparatus for retrieving music plays, by the music playing device, the music extracted by the music extraction device. Thus, since the user can select music after listing to it, he or she can find music that further matches with his or her preference.

A third aspect of the present invention proposes the apparatus for retrieving music according to the first aspect, further comprising a music purchase accepting device for accepting a purchase of music made by the user from the music retrieved by said music retrieval device (which, for example, corresponds to a music purchase accepting section 107 shown in FIG. 2).

According to this invention, the apparatus for retrieving music accepts, by the music purchase accepting device, a purchase of music made by the user from the music retrieved by said music retrieval device. Thus, when music that matches with the user's own preference is identified, the user can purchase that music.

A fourth aspect of the present invention proposes the apparatus for retrieving music according to the third aspect, further comprising a reward point providing device for providing a predetermined number of reward point to at least one of the music selected, the selection of which is accepted by said music selection accepting device and the music, the purchase of which is accepted by said music purchase accepting device (which, for example, corresponds to a reward point providing section 108 shown in FIG. 2).

According to this invention, the apparatus for retrieving music provides, by the reward point providing device, reward points to at least one of the music selected, the selection of which is accepted by said music selection accepting device and the music, the purchase of which is accepted by said music purchase accepting device.

Accordingly, providing reward points to the providers of the music can motivate them to provide more music. This allows music that match with the user preference to be retrieved from a greater number of music.

Furthermore, by extracting a predetermined number of music according to the descending order of the reward point from each cluster when extracting music by the music extraction device, the user can make a retrieval based on music that have been frequently purchased or selected. This enables the user to effectively make a retrieval based on music that have been frequently selected or purchased, i.e., music which the user is more interested in.

Here, music that gather higher reward points in the user's selections or purchases of music are expected to be music which the user is more interested in, e.g., well-known music or music offered by famous artists, as described above. It is also expected that older music that are not popular at present but were in the past attracts a greater number of the users' selections of music accepted by music selection accepting device. Thus, as described above, by extracting a predetermined number of music according to the descending order of the reward point from each cluster when extracting music by the music extraction device, effective retrieval can be achieved. In addition, this may create new need for music retrieval as means for retrieving older music or music that the user have already purchased.

A fifth aspect of the present invention proposes the apparatus for retrieving music according the first aspect, further comprising a repeating device for repeating the extraction of music by said music extraction device, the accepting a selection of music by said music selection accepting device, and the retrieving music by said music retrieval device (which, for example, corresponds to a repeating section 109 shown in FIG. 2), wherein said music extraction device extracts the predetermined number of music from each of said plurality of clusters before the music are retrieved by said music retrieval device, and extracts from the music that are retrieved after the music are retrieved by said music retrieval device.

According to this invention, the apparatus for retrieving music repeats, by the repeating device, the extracting music by the music extraction device, the accepting a selection of music by the music selection accepting device, and the retrieving music by the music retrieval device. Furthermore, the music extraction device extracts a predetermined number of music from each of the plurality of clusters before the music are retrieved by the music retrieval device, and extracts from the music that are retrieved according to the descending order of the similarity after the music are retrieved by the music retrieval device.

Accordingly, by repeating extraction of music recursively, accepting a selection of music, and retrieving music, music retrieval based on the music selected by the user can be performed several times. As a result, user can retrieve music that match with the user preference one after another. Furthermore, when the retrieval results seem to start diverting from the user preference, a retrieval can be restarted from the beginning by recreating the music list.

Figure 4:
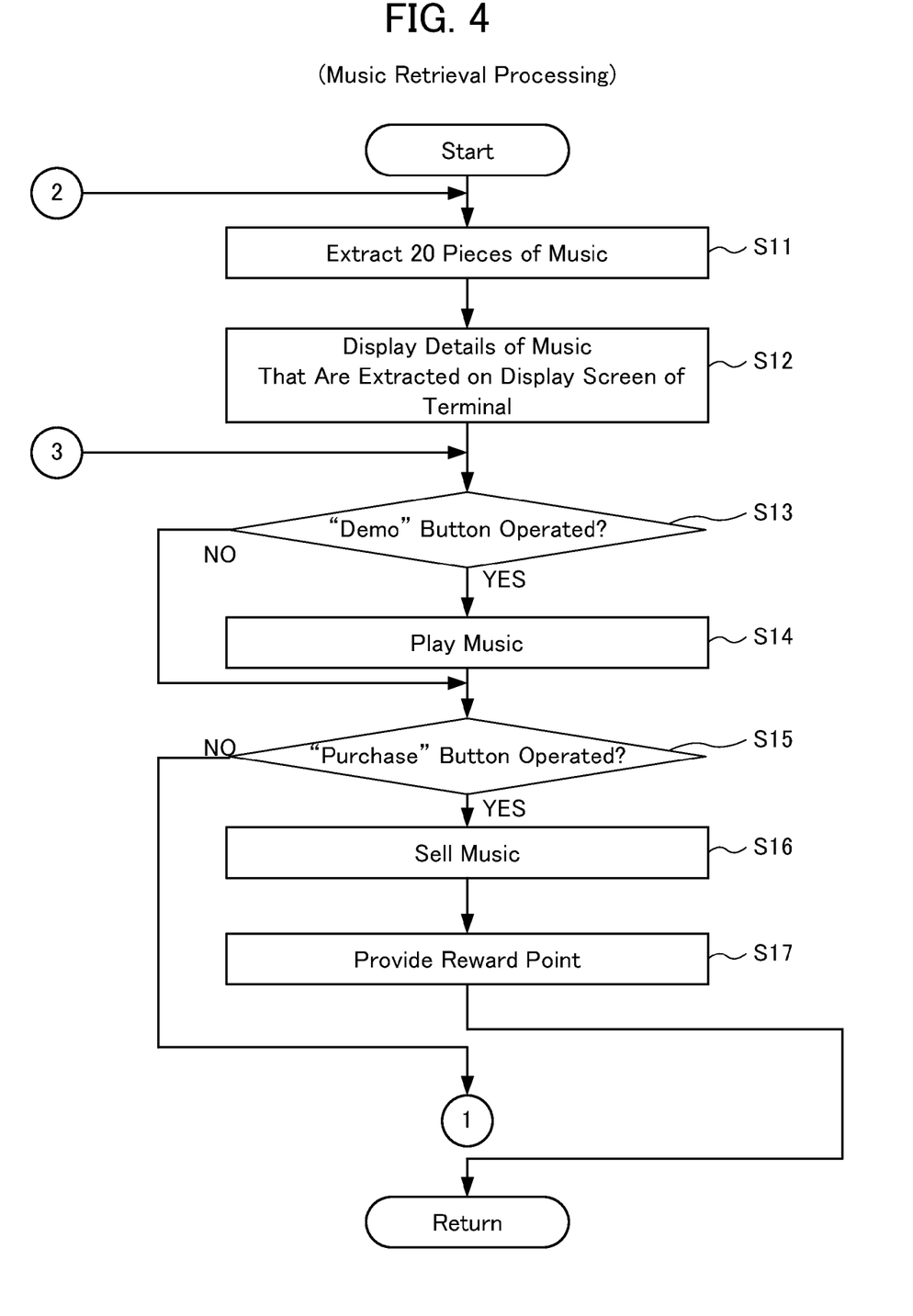
FIG. 4 is a diagram illustrating a music retrieval processing of the music retrieval apparatus according to an embodiment of the present invention.
Figure 5:
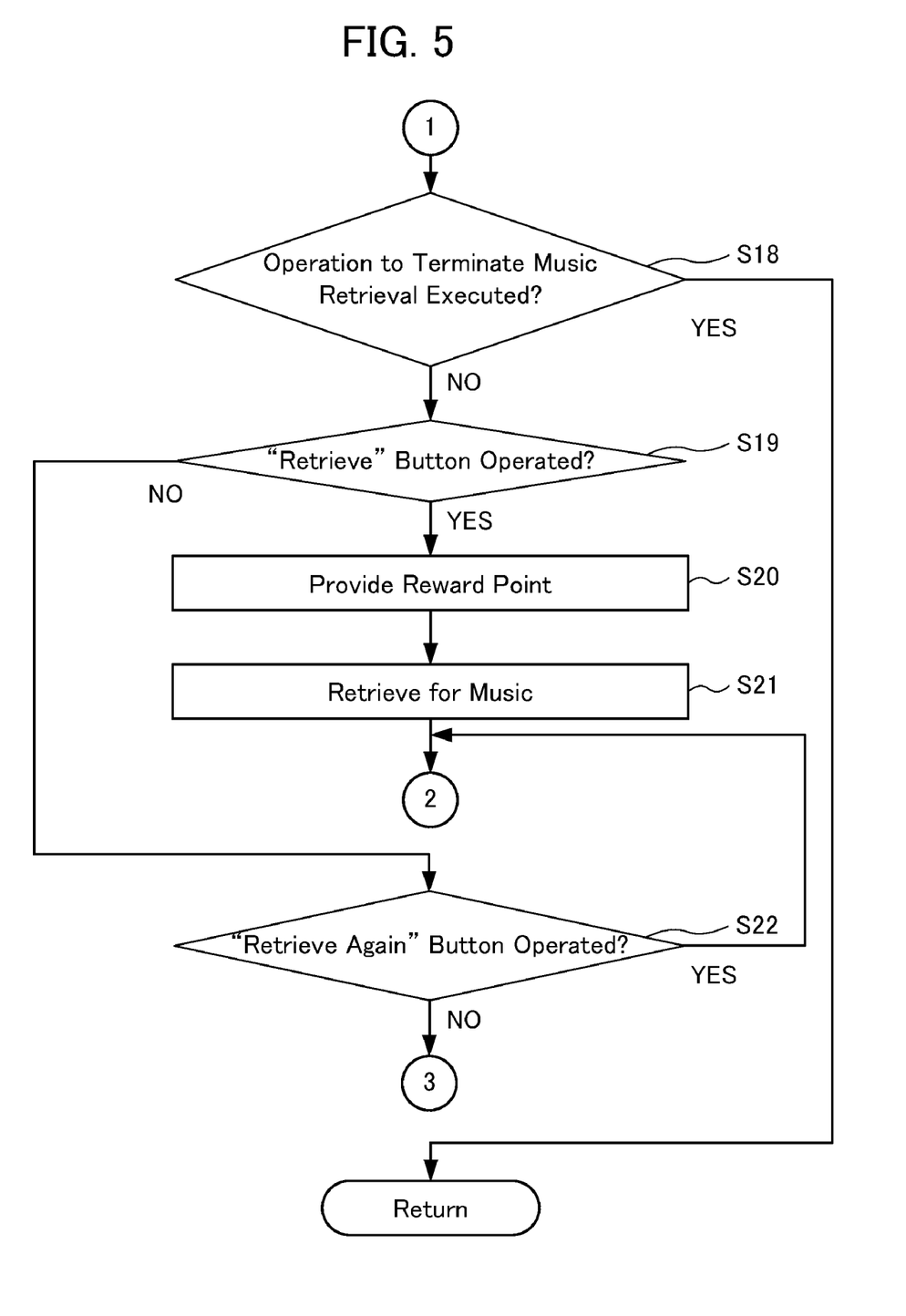
FIG. 5 is a diagram illustrating the music retrieval processing of the music retrieval apparatus according to an embodiment of the present invention.

A sixth aspect of the present invention proposes a method of retrieving music that matches with a preference of a user across a plurality of music, comprising: a first step of generating feature vectors of said respective plurality of music (which, for example, corresponds to Step S1 shown in FIG. 3); a second step of clustering said plurality of music into a plurality of clusters according to the feature vectors generated in the first step (which, for example, corresponds to Step S2 shown in FIG. 3); a third step of extracting a predetermined number of music from each of said plurality of clusters (which, for example, corresponds to Step 11 shown in FIG. 4); a fourth step of accepting a selection of music by the user from the music extracted in the third step (which, for example, corresponds to Step S19 shown in FIG. 5); and a fifth step of calculating similarities between a feature vector of the music selected, the selection of which is accepted in the fourth step and feature vectors of said respective plurality of music, and retrieving music that have higher similarities to said selected music among said plurality of music (which, for example, corresponds to Step S21 shown in FIG. 5).

According to this invention, feature vectors for each of the plurality of music is generated, and the plurality of music are clustered into a plurality of clusters based on these generated feature vectors. Then, a predetermined number of music is extracted from each of the plurality of clusters, and music selected by the user from the music that are extraction is accepted. Furthermore, similarities between a feature vector of the music selected, the selection of which is accepted and the feature vectors for each of the plurality of music are calculated, and music that have higher similarities to the selected music are retrieved among the plurality of music.

In other words, the plurality of music are clustered into a plurality of clusters according to their feature vectors, the predetermined number of music are extracted from each cluster, and the user is prompted to select music from the music that are extracted. Then, music having feature vectors having higher similarities to the feature vector of the music selected by the user are retrieved.

Accordingly, notwithstanding whether the user is fully aware of which music should be retrieved or not, by selecting music from the music that are extracted, the user can retrieve music having higher similarities to the selected music. Thus, even when the user is not fully aware of which music should be retrieved, he or she can make a music retrieval.

In addition, since the user selects music from the music extracted from various different clusters, the user can choose music to be used for a retrieval from a wide variety of music independent of exiting genres. Thus, music that match with the user preference can be identified. Furthermore, since titles of music, names of artists, names of genres, or the like to be retrieved are not required when retrieving, the user can retrieve for titles or artists that the user does not know, or can make a retrieval from unexpected genres.

As described above, even when the user is not fully aware of which music should be retrieved, music that match with the user preference can be retrieved.

A seventh aspect of the present invention proposes the method of retrieving music according to the sixth aspect, further comprising a sixth step of playing the music in the third step (which, for example, corresponds to Step S14 shown in FIG. 4).

According to this invention, the extracted music are played. Thus, since the user can select music after listing to it, he or she can find music that further matches with his or her preference.

An eighth aspect of the present invention proposes the method of retrieving music according to the sixth aspect, further comprising a seventh step of accepting a purchase of music made by the user from the music retrieved in the fifth step (which, for example, corresponds to Step S15 shown in FIG. 4).

According to this invention, a purchase of music made by the user from the music retrieved is accepted. Thus, when music that matches with the user's own preference is identified, the user can purchase that music.

A ninth aspect of the present invention proposes the apparatus for retrieving music according to the eighth aspect, further comprising an eighth step of providing a reward point to at least one of the music selected, the selection of which is accepted in the fourth step or the music, the purchase of which is accepted in the seventh step (which, for example, correspond to Step S17 shown in FIG. 4 and Step S20 shown in FIG. 5).

According to this invention, a reward point is provided to at least one of the music selected, the selection of which is accepted and the music, the purchase of which is accepted.

Accordingly, providing reward points to the providers of the music can motivate them to provide more music. This allows music that match with the user preference to be retrieved from a greater number of music.

Furthermore, by extracting a predetermined number of music according to the descending order of the reward point from each cluster when extracting music, the user can make a retrieval based on music that have been frequently purchased or selected. This enables the user to effectively make a retrieval based on music that have been frequently selected or purchased, i.e., music which the user is more interested in.

Here, music that gather higher reward points in the user's selections or purchases of music are expected to be music which the user is more interested in, e.g., well-known music or music offered by famous artists, as described above. It is also expected that older music that are not popular at present but were in the past attracts a greater number of the users' selections of music accepted by music selection accepting device. Thus, as described above, by extracting a predetermined number of music according to the descending order of the reward point from each cluster when extracting music by the music extraction device, effective retrieval can be achieved. In addition, this may create new need for music retrieval as means for retrieving older music or music that the user have already purchased.

A tenth aspect of the present invention proposes the method of retrieving music according to sixth aspect, further comprising a ninth step of repeating said third step, said fourth step, and said fifth step (which, for example, corresponds to transitioning the flow from Step S21 or S22 shown in FIG. 5 to Step 11 shown in FIG. 4, or transitioning the flow from Step S22 shown in FIG. 5 to Step 13 shown in FIG. 4), wherein in said third step, the predetermined number of music is extracted from each of said plurality of clusters before the fifth step is executed, and the extraction is executed from the music that are retrieved after the fifth step is executed.

According to this invention, the extracting music, the accepting a selection of music, and the retrieving music are repeated. Furthermore, the predetermined number of music is extracted from each of the plurality of clusters before the music are retrieved, and music are extracted from the music that are retrieved according to the descending order of the similarity after the music are retrieved.

Accordingly, by repeating extraction of music recursively, accepting a selection of music, and retrieving music, music retrieval based on the music selected by the user can be performed several times. As a result, user can retrieve music that match with the user preference one after another. Furthermore, when the retrieval results seem to start diverting from the user preference, a retrieval can be restarted from the beginning by recreating the music list.

A eleventh aspect of the present invention proposes a program for making a computer to execute a method of retrieving music that matches with a preference of a user across a plurality of music, comprising: a first step of generating feature vectors of said respective plurality of music (which, for example, corresponds to Step S1 shown in FIG. 3); a second step of clustering said plurality of music into a plurality of clusters according to the feature vectors generated in the first step (which, for example, corresponds to Step S2 shown in FIG. 3); a third step of extracting a predetermined number of music from each of said plurality of clusters (which, for example, corresponds to Step 11 shown in FIG. 4); a fourth step of accepting a selection of music by the user from the music extracted in the third step (which, for example, corresponds to Step S19 shown in FIG. 5); and a fifth step of calculating similarities between a feature vector of the music selected, the selection of which is accepted in the fourth step and feature vectors of said respective plurality of music, and retrieving music that have higher similarities to said selected music among said plurality of music (which, for example, corresponds to Step S21 shown in FIG. 5).

According to this invention, by making the computer to execute the method of retrieving music, feature vectors for each of the plurality of music is generated, and the plurality of music are clustered into a plurality of clusters based on these generated feature vectors. Then, a predetermined number of music is extracted from each of the plurality of clusters, and music selected by the user from the music that are extracted is accepted. Furthermore, similarities between a feature vector of the music selected, the selection of which is accepted and the feature vectors for each of the plurality of music are calculated, and music that have higher similarities to the selected music are retrieved among the plurality of music.

In other words, the plurality of music are clustered into a plurality of clusters according to their feature vectors, the predetermined number of music are extracted from each cluster, and the user is prompted to select music from the music that are extracted. Then, music having feature vectors having higher similarities to the feature vector of the music selected by the user are retrieved.

Accordingly, notwithstanding whether the user is fully aware of which music should be retrieved or not, by selecting music from the music that are extracted, the user can retrieve music having higher similarities to the selected music. Thus, even when the user is not fully aware of which music should be retrieved, he or she can make a music retrieval.

In addition, since the user selects music from the music extracted from various different clusters, the user can choose music to be used for a retrieval from a wide variety of music independent of exiting genres. Thus, music that match with the user preference can be identified. Furthermore, since titles of music, names of artists, names of genres, or the like to be retrieved are not required when retrieving, the user can retrieve titles or artists that the user does not know, or can make a retrieval from unexpected genres.

As described above, even when the user is not fully aware of which music should be retrieved, music that match with the user preference can be retrieved.

Advantageous Effects of Invention

According to this invention, notwithstanding whether the user is fully aware of which music should be retrieved or not, by selecting music from the music that are extracted, the user can retrieve for music having higher similarities to the selected music. Thus, even when the user is not fully aware of which music should be retrieved, he or she can make a music retrieval.

In addition, since the user selects music from the music extracted from various different clusters, the user can choose music to be used for a retrieval from a wide variety of music independent of exiting genres. Thus, music that match with the user preference can be identified. Furthermore, since titles of music, names of artists, names of genres, or the like to be retrieved are not required when retrieving, the user can retrieve titles or artists that the user does not know, or can make a retrieval from unexpected genres.

As described above, even when the user is not fully aware of which music should be retrieved, music that match with the user preference can be retrieved.

DESCRIPTION OF EMBODIMENTS

Hereinafter, an embodiment of the prevent invention will be described with reference to the drawings.

It should be noted that components of these embodiments may be replaced with any existing components where necessary, or wide variety of variations including combinations with other existing components are also contemplated. Accordingly, the description of this embodiment should not be interpreted as limiting the contents of the invention that are defined in the appended claims.

Structure of Music Retrieving System

Figure 1:
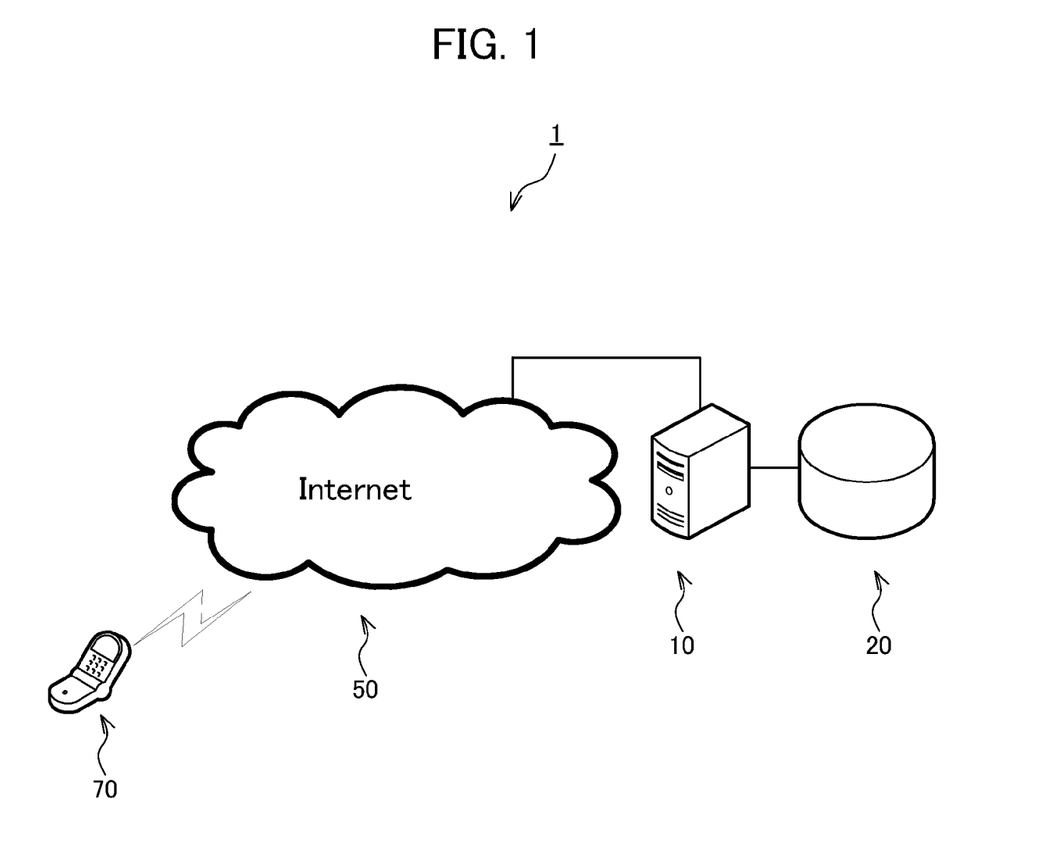
FIG. 1 is a diagram illustrating a structure of a music retrieving system according to an embodiment of the present invention.

FIG. 1 is a diagram illustrating a structure of a music retrieval system 1 according to an embodiment of the present invention. The music retrieval system 1 includes a music storage device 20 having a plurality of music stored therein, a music retrieval apparatus 10 that retrieves music that match with a preference of a user across the plurality of music stored in the music storage device 20, and a terminal 70 that is provided to be operable by the user. The music storage device 20 is communicatively coupled to the music retrieval apparatus, and the music retrieval apparatus 10 is communicatively coupled to the terminal 70 via the Internet 50.

It should be noted that although only one terminal 70 is shown in FIG. 1 as a terminal being communicatively coupled and being operable by the user, a plurality of terminals may be coupled in addition to the terminal 70. Hereinafter, a case wherein the user having the terminal 70 retrieves music that match with the user preference through the music retrieval apparatus 10.

Structure of Music Retrieval Apparatus

FIG. 2 is a block diagram illustrating the structure of the music retrieval apparatus 10. The music retrieval apparatus 10 includes a feature vector generating section 101 that generates feature vectors for the respective music stored in the music storage device 20; a clustering section 102 that clusters each of the music stored in the music storage device 20 into a plurality of clusters; a music extraction section 103 that extracts music from the plurality of music stored in the music storage device 20; a music selection accepting section 104 that accepts a selection of music made by the user; a music retrieval section 105 that retrieves music; a music play section 106 that plays the music extracted by the music extraction section 103; a music purchase accepting section 107 that accepts a purchase of the music made by the user; a reward point providing section 108 that provides a reward point to the music selected, the selection of which is made by the music selection accepting section 104; and a repeating section 109 that repeats extraction of music by the music extraction section 103, accepting a selection of music by the music selection accepting section 104, and retrieves music by the music retrieval section 105.

The feature vector generating section 101 extracts features from each of the music stored in the music storage device 20, and generates feature vectors for the respective music. It should be noted that this embodiment employs the Tree-based Vector Quantization technique (TreeQ) disclosed in Japanese Unexamined Patent Application, First Publication No. 2006-243887 as a technique for generating feature vectors for each music.

The clustering section 102 clusters each of the music stored in the music storage device 20 into a plurality of clusters based on a feature vector of each music which is generated by the feature vector generating section 101. It should be noted that this embodiment employs the k-means clustering algorithm as a clustering technique. It also should be noted that in order to reduce the processing time, it is desirable to sample some parts of music for generating clusters since the processing time required for clustering all music into clusters increases as the number of music stored in the music storage device 20 increases.

The music extraction section 103 extracts 20 music from the plurality of music stored in the music storage device 20. More specifically, the music extraction section 103 extracts a piece of music based on the resultant clusters made by the clustering section 102 when a "Retrieve Again" button B4 is operated which will be described below, or before the music retrieval section 105 retrieves music, i.e., when extraction of music is executed for the first time. After music are retrieved by the music retrieval section 105, i.e., when extraction of music are executed out twice or more, the music extraction section 103 extracts the music that have been retrieved by the music retrieval section 105.

The music selection accepting section 104 accepts a selection of music made by the user from the music extracted by the music extraction section 103. More specifically, details of each of the 20 pieces of music extracted by the music extraction section 103, such as the names or the authors, are sent to the terminal 70, and the details are displayed on a display screen of the terminal 70. This prompts the user having the terminal 70 to select a piece of music from the 20 pieces of music extracted by the music extraction section 103. Once a piece of music is selected by the user from the music extracted by the music extraction section 103, an information indicating the music selected by the user is received from the terminal 70.

The music retrieval section 105 retrieves 20 pieces of music that have higher similarities to the music received by the music selection accepting section 104. More specifically, the music retrieval section 105 calculates similarities between the feature vector of the selected music selection accepted by the music selection accepting section 104 and feature vectors of the respective plurality of music stored in the music storage device 20, and identifies music having similarities to the feature vector of the selected music equal to or greater than a predetermined value from the plurality of music stored in the music storage device 20.

It should be noted that this embodiment employs the cosine similarity as the technique to calculate similarities. For example, the similarity Sim (dk1, dk2) between the feature vector of the selected music dk1 and a feature vector dk2 of one of the plurality of music stored in the music storage device 20 can be expressed as follows:

[Expression 1]

$$Sim(dk1, dk2) = \frac{dk1 \cdot dk2}{|dk1| \cdot |dk2|} \quad (1)$$

The music play section 106 plays a part of music which is selected by the user for playing it in a play mode from the 20 pieces of music extracted by the music extraction section 103. More specifically, once the user executes an operation on the terminal 70 to play a piece of music in the play mode while the music selection accepting section 104 displays details of the 20 pieces of music extracted by the music extraction section 103, the selected music is read from the music storage device 20. Then, a part of the music that is read is sent to the terminal 70, and is output from speaker(s) of the terminal 70.

The music purchase accepting section 107 accepts a purchase of music made by the user from the music retrieved by the music retrieval section 105. More specifically, once the user executes an operation on the terminal 70 to purchase a piece of music while the music selection accepting section 104 displays details of the 20 pieces of music extracted by the music extraction section 103, a billing processing is started.

After the billing processing is completed and the user finishes the payment of the charge, the music which the user wishes to purchase is read from the music extraction section 103 and is sent to the terminal 70.

The reward point providing section 108 provides one reward point for each of the music selected, the selection of which is accepted by the music selection accepting section 104 and the music, the purchase of which is accepted by the music purchase accepting section 107. For example, an administrator of the music retrieval system 1 calculates the sum of reward points provided to each music for a predetermined period of time, and gives money according to the calculated reward points to a music provider.

The repeating section 109 repeats extraction of music recursively by the music extraction section 103, accepting a selection of music by the music selection accepting section 104, and retrieving music by the music retrieval section 105 until a purchase of music is accepted by the music purchase accepting section 107 or the user execute an operation on the terminal 9 to terminate the retrieval of music by the music retrieval apparatus 10.

Music Retrieval Processing by the Apparatus for Music Retrieval

Figure 3:
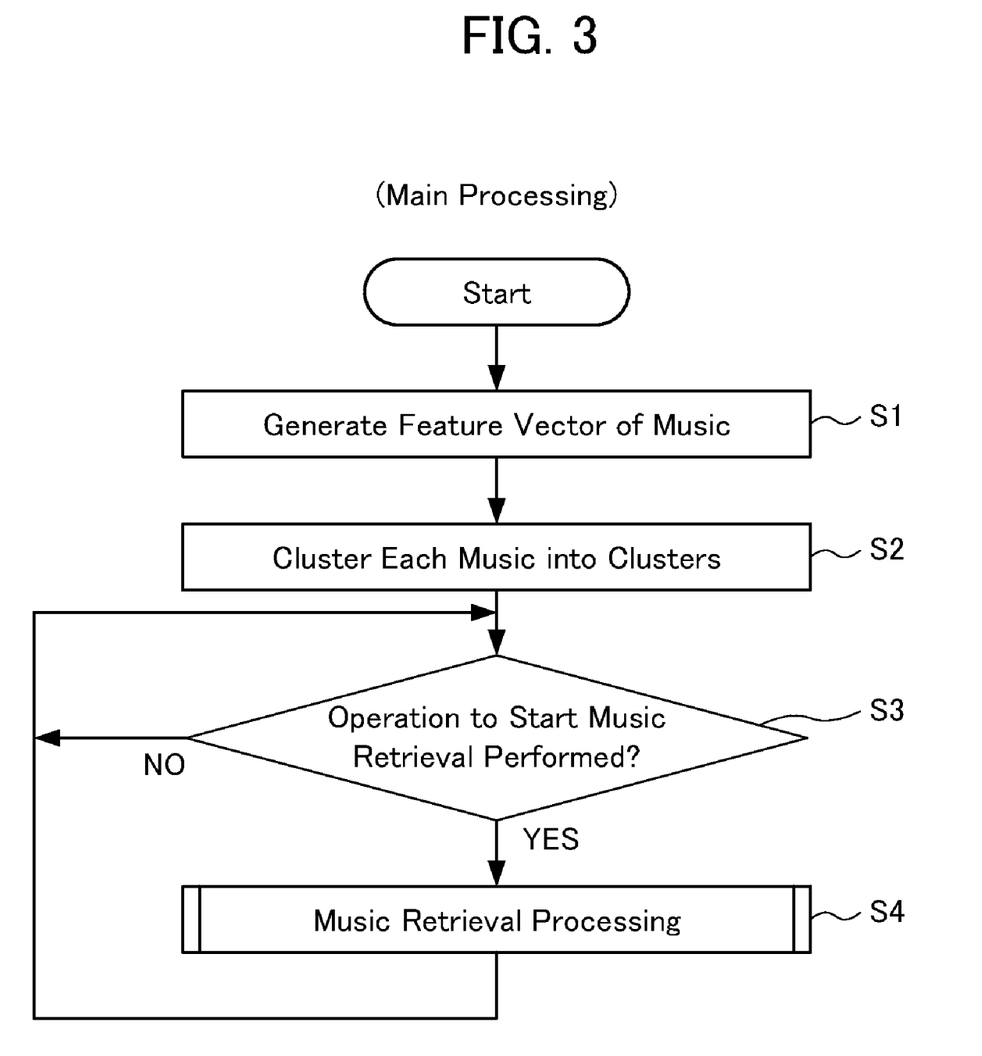
FIG. 3 is a diagram illustrating a main processing of the music retrieval apparatus according to an embodiment of the present invention.

The procedure executed by the music retrieval apparatus 10 for retrieving music that match with a user preference across the plurality of music stored in the music storage device 20 will be described with reference to the flowcharts of FIGS. 3-5.

First, the main processing executed by the music retrieval apparatus 10 will be described with reference to the flowchart of FIG. 3.

First, in Step S1, the feature vector generating section 101 generates feature vectors for the respective music stored in the music storage device 20.

Then, in Step S2, the clustering section 102 clusters the music stored in the music storage device 20 into a plurality of clusters according to the feature vectors of the respective music generated in Step S1.

Then, in Step S3, it is determined whether the user executes an operation to start a music retrieval. If it is determined that the user executes an operation to start a music retrieval, the flow proceeds to Step S4. Otherwise, if it is determined that the user does not make an operation to start a music retrieval, Step S3 is repeated.

Once the user executes an operation to start a music retrieval, the terminal 70 sends a retrieval started signal to the music retrieval apparatus 10. The music retrieval apparatus 10 determines whether the user executes an operation to start a music retrieval based on reception of a retrieval started signal from the terminal 70.

Then, in Step S4, a music retrieval processing shown in the flowcharts of FIGS. 4 and 5 is executed and the flow returns to Step S3.

Next, the music retrieval processing executed by the music retrieval apparatus 10 will be described with reference to the flowcharts of FIGS. 4 and 5.

First, in Step S11, the music extraction section 103 extracts 20 pieces of music from the plurality of music stored in the music storage device 20. More specifically, when Step S11 is executed after Step S3 in FIG. 3 or when Step S11 is executed after Step S22 in FIG. 5, 20 pieces of music are extracted, each of which being selected from each cluster according to the results of Step S2 in FIG. 2. On the other hand, when Step S11 is executed after Step S21 in FIG. 5, 20 pieces of music retrieved in Step S21 are extracted.

Figure 6:
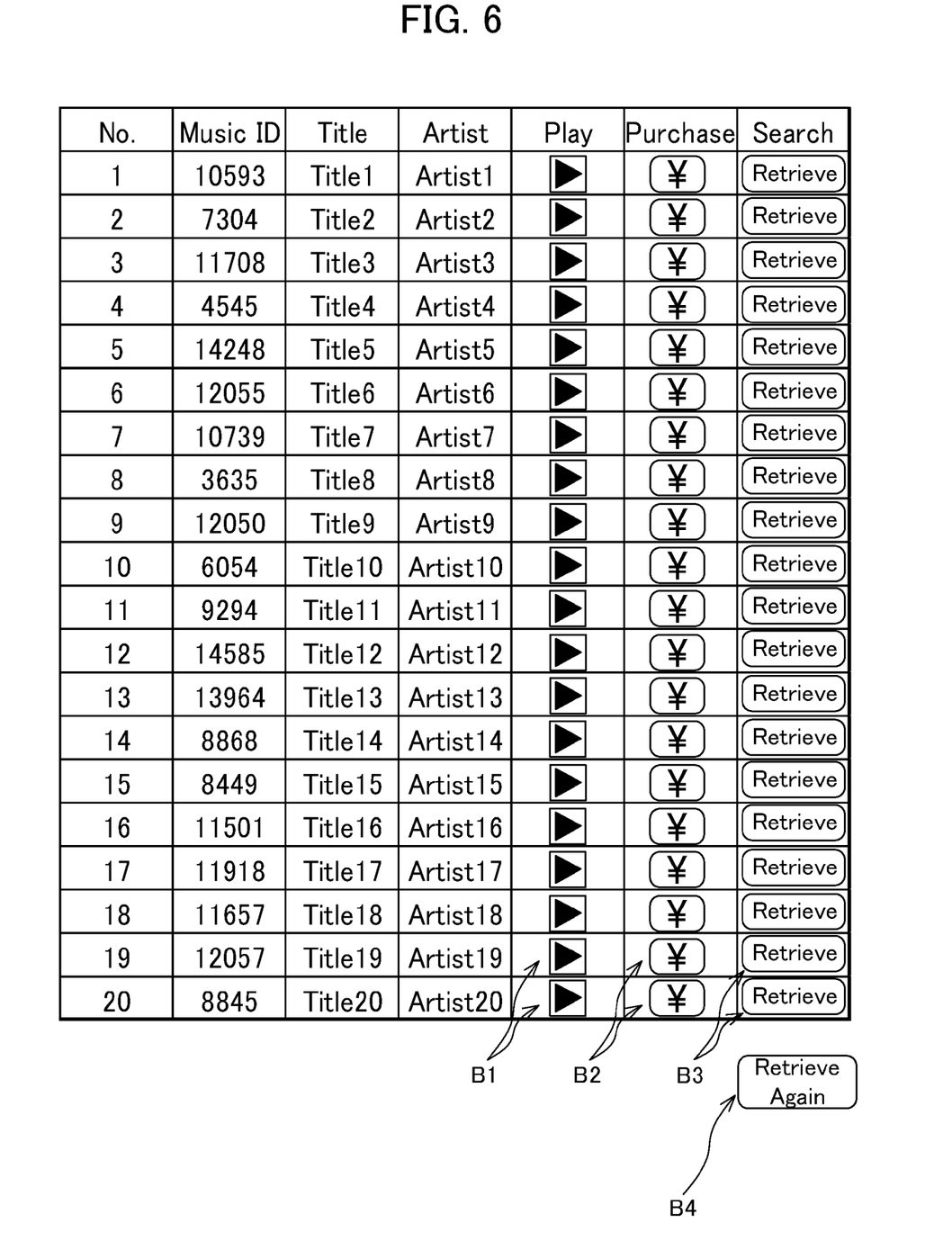
FIG. 6 is a diagram illustrating an example of a display screen on a terminal according to an embodiment of the present invention.
Figure 7:
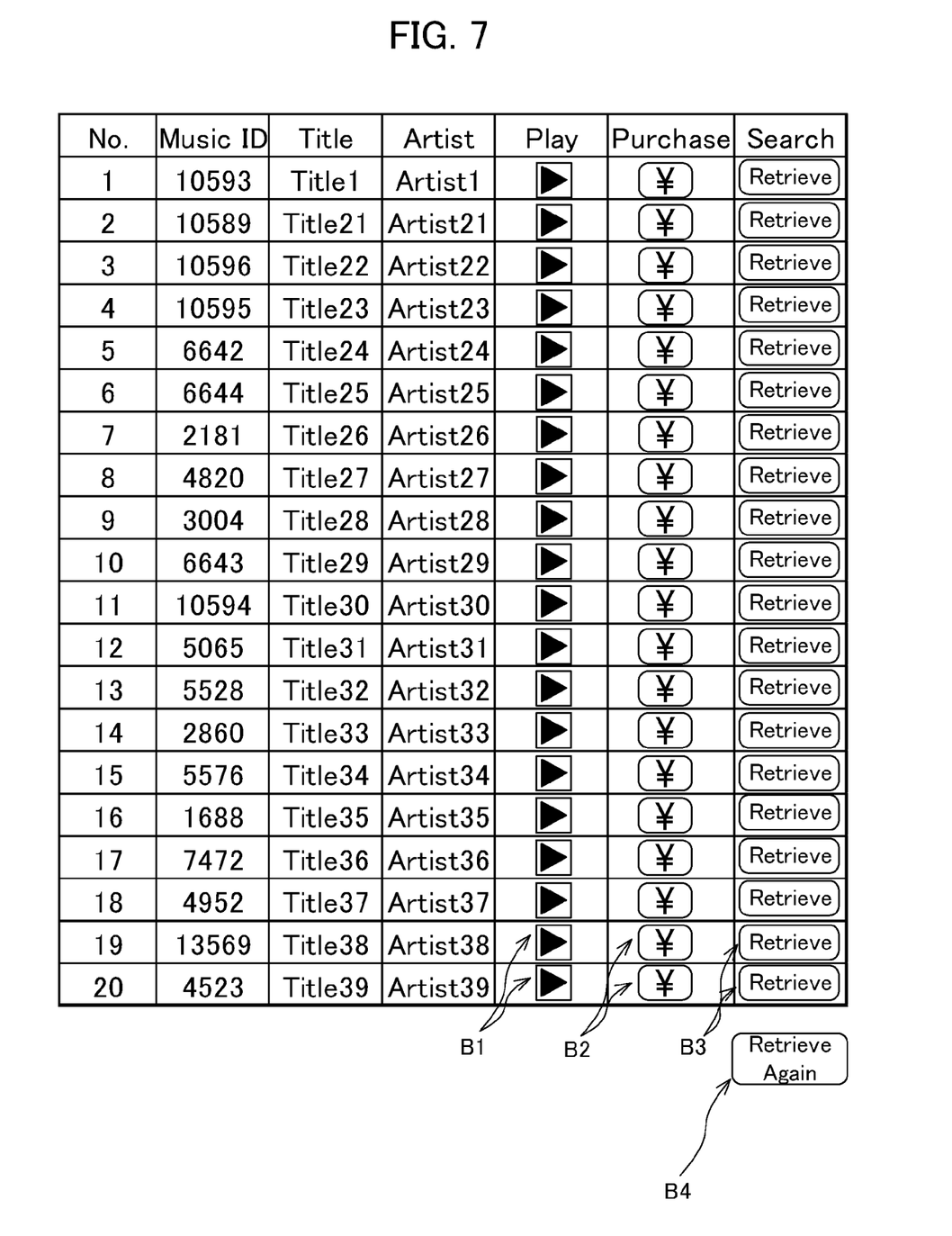
FIG. 7 is a diagram illustrating an example of the display screen on the terminal according to an embodiment of the present invention.

Then, in Step S12, the music selection accepting section 104 sends details of the 20 pieces of music extracted in Step S11 to the terminal 70, and the details are displayed on a display screen of the terminal 70, as shown in FIGS. 6 and 7. The details of the music include "Music IDs" that are unique numerical values for identifying the respective plurality of music stored in the music storage device 20, "Titles" indicating the titles of the music, and "Artists" indicating the authors of the music. In addition to those details of the music, the following buttons are displayed for each of the music: "Play" button B1 for the user to operate when playing the music in the play mode, "Purchase" button B2 for the user to operate when purchasing the music, and "Retrieve" button B3 for the user to operate when retrieving music. Also displayed is one "Retrieve Again" button B4 for the user to operate when restarting music retrieval from the beginning. Noted that FIGS. 6 and 7 will be described in detail later.

Then, in Step S13, the music play section 106 determines whether the user operates a "Play" button B1. If it is determined that the user operates a "Play" button B1, the flow proceeds to Step S14. Otherwise, if it is determined that the user does not operate a "Play" button B1, the flow proceeds to Step S15.

Once the user operates a "Play" button B1, the terminal 70 sends a play requested signal indicating which music corresponds to the operated "Play" button B1 to the music retrieval apparatus 10. The music retrieval apparatus 10 determines whether the user operates a "Play" button B1 based on reception of a play started signal from the terminal 70.

Then, in Step S14, the music play section 106 plays a part of the music corresponding to the operated "Play" button B1 among the 20 pieces of music extracted in Step S11. More specifically, the music corresponding to the operated "Play" button B1 is read from the music storage device 20 based on the play requested signal, and a part of that music is sent to the terminal 70 and is output from the speaker(s) of the terminal 70.

Then, in Step S15, the music purchase accepting section 107 determines whether the user operates a "Purchase" button B2. If it is determined that the user operates a "Purchase" button B2, the flow proceeds to Step S16. Otherwise, if it is determined that the user does not operate a "Purchase" button B2, the flow proceeds to Step S18 in FIG. 5.

Once the user operates a "Purchase" button B2, the terminal 70 sends a purchase requested signal indicating which music corresponds to the operated "Purchase" button B2 to the music retrieval apparatus 10. The music retrieval apparatus 10 determines whether the user operates a "Purchase" button B2 based on reception of a purchase requested signal from the terminal 70.

Then, in Step S16, the music purchase accepting section 107 sells the music corresponding to the operated "Purchase" button B2 among the 20 pieces of music extracted in Step S11. More specifically, a billing processing for the music corresponding to the operated "Purchase" button B2 is started based on the purchase requested signal. After the billing processing is completed and the user finishes the payment of the charge, the music corresponding to the operated "Purchase" button B2 is read from the music storage device 20 and is sent to the terminal 70. When the transmission of the music to the terminal 70 is completed, the flow proceeds to Step S17.

Then, in Step S17, the reward point providing section 108 provides one reward point to the music corresponding to the operated "Purchase" button B2. The music retrieval processing is then completed, and the flow proceeds to Step S3 in FIG. 3.

Then, in Step S18 shown in FIG. 5, it is determined whether the user executes an operation to terminate music retrieval. If it is determined that the user executes an operation to terminate music retrieval, the music retrieval processing is terminated and the flow proceeds to Step S3 in FIG. 3. If it is determined that the user does not make an operation to terminate music retrieval, the flow proceeds to Step S19.

Once the user executes an operation to terminate music retrieval, the terminal 70 sends a retrieval terminated signal to the music retrieval apparatus 10. The music retrieval apparatus 10 determines whether the user executes an operation to terminate music retrieval based on reception of a retrieval terminated signal from the terminal 70.

Then, in Step S19, the music selection accepting section 104 determines whether the user operates a "Retrieve" button B3. If it is determined that the user operates a "Retrieve" button B3, the flow proceeds to Step S20. Otherwise, if it is determined that the user does not operate a "Retrieve" button B3, the flow proceeds to Step S22.

Once the user operates a "Retrieve" button B3, the terminal 70 sends a retrieval requested signal indicating which music corresponds to the operated "Retrieve" button B3 to the music retrieval apparatus 10. The music retrieval apparatus 10 determines whether the user operates a "Retrieve" button B3 based on reception of a retrieval requested signal from the terminal 70.

Then, in Step S20, the reward point providing section 108 provides one reward point to the music corresponding to the operated "Retrieve" button B3.

Then, in Step S21, the music retrieval section 105 retrieves 20 pieces of music having higher similarities to the music corresponding to the operated "Retrieve" button B3 among the plurality of music stored in the music storage device 20, and the flow proceeds to Step S11.

Then, in Step S22, it is determined whether the user operates the "Retrieve Again" button B4. If it is determined that the user operates the "Retrieve Again" button B4, the flow proceeds to Step S11. Otherwise, if it is determined that the user does not operate the "Retrieve Again" button B4, the flow proceeds to Step S13.

Once the user operates the "Retrieve Again" buttons B4, a retrieval again requested signal indicating the operation of this button is sent to the music retrieval apparatus 10. The music retrieval apparatus 10 determines whether the user operates the "Retrieve Again" buttons B4 based on reception of a retrieval again requested signal from the terminal 70.

Exemplary Screen of Details of Music on Music Retrieval Apparatus

Examples of details of music displayed by the music retrieval apparatus 10 will be described with reference to FIGS. 6 and 7.

FIG. 6 shows an example of the display screen on the terminal 70 when the above-described Step S11 is executed after Step S3. In this exemplary screen, details of totaling 20 pieces of music, each of which being extracted from each cluster, are displayed.

FIG. 7 shows an example of the display screen on the terminal 70 when the above-described Step S11 is executed after Step S21. This exemplary screen is displayed when the user operates a "Retrieve" button B3 corresponding to the music having the Music ID of "10593." In this example, details of totaling 20 pieces of music, namely, the music having the Music ID of "10593" and 19 pieces of music having higher similarities to this music are displayed According to the music retrieval apparatus 10 described above, the plurality of music stored in the music storage device 20 are clustered into a plurality of clusters according to their feature vectors, totaling 20 pieces of music are extracted, each of which being extracted from each cluster, and the user is prompted to select a piece of music from the 20 pieces of music. Then, 20 pieces of music having feature vectors having higher similarities to the feature vector of the music selected by the user are retrieved.

Accordingly, notwithstanding whether the user is fully aware of which music should be retrieved or not, by selecting music from the 20 pieces of music that are extracted, the user can retrieve music having higher similarities to the selected music. Thus, even when the user is not fully aware of which music should be retrieved, he or she can make a music retrieval.

In addition, since the user selects music from the music extracted from various different clusters, the user can choose music to be used for a retrieval from a wide variety of music independent of exiting genres. Thus, music that match with the user preference can be identified. Furthermore, since titles of music, names of authors, names of genres, or the like to be retrieved are not required when retrieving, the user can retrieve names or authors that the user does not know, or can make a retrieval from unexpected genres.

As described above, even when the user is not fully aware of which music should be retrieved, music that match with the user preference can be retrieved.

Furthermore, according to the music retrieval apparatus 10 described above, when the user operates "Play" button B1, a part of music corresponding to the operated "Play" button B1 is output from the speaker(s) of the terminal 70. Thus, since the user can select music after listing to it, he or she can find music that further matches with his or her preference.

Furthermore, according to the music retrieval apparatus 10 described above, when the user operates "Purchase" button B2, the music corresponding to the operated "Purchase" button B2 is sold to the user. Thus, when music that matches with the user's own preference is identified, the user can purchase that music.

Furthermore, according to the music retrieval apparatus 10 described above, every time the user operates a "Purchase" button B2 or "Retrieve" button B3, one reward point is provided to the music corresponding to the operated "Purchase" button B2 or "Retrieve" button B3.

Thus, the administrator of the music retrieval system 1 calculates the sum of reward points provided to each music for a predetermined period of time, and gives money according to the calculated reward points to a music provider. Since this motivates music providers to provide more music, music that match with the user preference can be retrieved from a greater number of music.

For example, when 20 pieces of music are extracted by the music extraction section 103, music may be extracted one by one from each cluster according to the descending order of the reward point. Alternatively, or additionally, when retrieving music by the music retrieval section 105, music may be retrieved according to the descending order of the reward point, in the case where music have the same similarity. This enables the user to make a retrieval based on music corresponding to frequently operated "Purchase" buttons B2 or "Retrieve" buttons B3, i.e., music that have been frequently purchased or selected. This enables the user to effectively make a retrieval based on music that have been frequently purchased or selected, i.e., music which the user is more interested in.

Here, music that gather a greater number of operations of "Purchase" buttons B2 or "Retrieve" buttons B3 are expected to be music which the user is more interested in, e.g., well-known music or music offered by famous artists, as described above. It is also expected that older music that are not popular at present but were in the past attracts a greater number of operations of "Retrieve" buttons B3. Thus, as described above, when 20 pieces of music are extracted by the music extraction section 103, music may be extracted one by one from each cluster according to the descending order of the reward point. Alternatively, or additionally, when retrieving music by the music retrieval section 105, music may be retrieved according to the descending order of the reward point, in the case where music have the same similarity. This enables effective retrieval. In addition, this may create new need for music retrieval as means for retrieving older music or music that the user have already purchased.

Furthermore, when a plurality of terminals that are operable by users are communicatively coupled to the music retrieval apparatus 10, reward points of the respective terminals are summed. As described above, when 20 pieces of music are extracted by the music extraction section 103, music may be extracted one by one from each cluster according to the descending order of the reward point. Alternatively, or additionally, when retrieving music by the music retrieval section 105, music may be retrieved according to the descending order of the reward point, in the case where music have the same similarity. This makes possible to retrieve music that are popular among all users, i.e., bestseller music, having higher similarities.

Furthermore, according to the music retrieval apparatus 10 described above, extraction of music, accepting operations of "Retrieve" buttons B3, and retrieving music are repeated recursively until the user operates a "Purchase" button B2 or the user executes an operation to terminate music retrieval.

Accordingly, by repeating extraction of music recursively, accepting operations of "Retrieve" button B3, and retrieving music, music retrieval based on the music selected by the user can be performed several times. As a result, user can retrieve music that match with the user preference one after another.

Furthermore, according to the music retrieval apparatus 10 described above, when the user operates the "Retrieve Again" button B4, 20 pieces of music in total are extracted again, each of which being extracted from each cluster, and the user are prompted to make a selection from these music. This enables the user to command the music retrieval apparatus 10 to re-execute music retrieval once again with a simple operation of using the "Retrieve Again" button B4 when retrieved music diverts from the user's taste, or when the user wishes to retrieve music that have different tastes or are in different genres.

It should be noted that the present invention may be embodied by storing the processing executed by the music retrieval apparatus 10 of the present invention in a computer readable recording media, and commanding the music retrieval apparatus 10 to load and execute the programs stored in these recording media.

Furthermore, the above-described programs may be transmitted from the music retrieval apparatus 10 having the programs stored therein to other computer systems, through a transmission medium, or through carrier wave carried on a transmission medium. As used herein, the term "transmission medium" that propagates programs refers to a medium that is capable of transmitting information, including networks (communication networks), such as the Internet, or communication lines, such as telephone lines (communication path).

Furthermore, the above-described programs may implement some part of the functions described above. In addition, such programs may implement the above-described functions in a combination with programs stored in the music retrieval apparatus 10, that is, the programs may be so-called differential files (differential programs).

Although some embodiments of the present invention have been described with reference to the attached drawings, this invention is not limited to the embodiments described above. Variants thereof can be envisaged which do not exceed the scope of the present invention.

For example, although the above-described embodiment employs the Tree-based Vector Quantization technique (TreeQ) disclosed in Japanese Unexamined Patent Application, First Publication No. 2006-243887 as a technique for generating feature vectors for each music, the k-means clustering algorithm as a clustering technique, and the cosine similarity as the technique to calculate similarities, these are not intended to be limiting.

Although the above-described embodiment also employs feature vectors of music for music retrieval, this is not intended to be limiting.

Furthermore, in the above-described embodiment, although the number of music users can select is one, this is not intended to be limiting and users may select more than a piece of music.

REFERENCE SIGNS LIST

1 Music Retrieval System
10 Music Retrieval Apparatus
20 Music Storage Device
70 Terminal
101 Feature Vector Generating Section
102 Clustering Section
103 Music Extraction Section
104 Music Selection Accepting Section
105 Music Retrieval Section
106 Music Play Section
107 Music Purchase Accepting Section
108 Reward Point Providing Section
109 Repeating Section

CITATION LIST

Patent Literature 1: Japanese Laid-Open Patent Application No. 2003-99462
Patent Literature 2: Japanese Laid-Open Patent Application No. 2005-10771
Patent Literature 3: Japanese Laid-Open Patent Application No. 2005-18205
Patent Literature 4: Japanese Laid-Open Patent Application No. 2005-32409
Patent Literature 5: Japanese Laid-Open Patent Application No. 2005-77865
Patent Literature 6: Japanese Laid-Open Patent Application No. 2007-114798
Patent Literature 7: Japanese Laid-Open Patent Application No. 2007-233812

The invention claimed is:

1. An apparatus for retrieving for music that matches with a preference of a user across a plurality of music, comprising:
a feature vector generating device for generating feature vectors of said respective plurality of music;
a clustering device for clustering said plurality of music into a plurality of clusters according to the feature vectors generated by said feature vector generating device;
a music extract device for extracting a predetermined number of music from each of said plurality of clusters;
a music selection accepting device for accepting a selection of music by the user from the music extracted by said music extraction device; and
a music retrieval device for calculating similarities between a feature vector of the music selected, the selection of which is accepted by said music selection accepting device, and feature vectors of said respective plurality of music, and retrieving music that have higher similarities to said selected music among said plurality of music.

2. The apparatus for retrieving music according to claim 1, further comprising a music playing device for playing the music extracted by said music extraction device.

3. The apparatus for retrieving music according to claim 1, further comprising a repeating device arranged for extracting music based on the calculated similarities, accepting a selection of music from the extracted music based on the calculated similarities, and retrieving music based on calculating similarities between a feature vector of the music selected from the extracted music based on the previously calculated similarities and feature vectors of said respective plurality of music.

4. The apparatus for retrieving music according to claim 1, wherein the music retrieval device for calculating similarities includes a cosine similarity device which is constructed and arranged to:
(i) perform a set of cosine similarity operations defined by $$Sim(dk1, dk2) = \frac{dk1 \cdot dk2}{|dk1| \cdot |dk2|} \quad (1)$$

and
(ii) retrieve music belonging to the respective plurality of music only when Sim(dk1,dk2) exceeds a predetermined value, where dk1 is the feature vector of the selected music and dk2 is the feature vector of each music belonging to the respective plurality of music.

5. The apparatus for retrieving music according to claim 1, wherein the selected music is provided by a first musical composer in accordance with a first musical score; and
wherein the music retrieval device for calculating similarities is constructed and arranged to retrieve music which is provided by a second musical composer in accordance with a second musical score, the first musical composer being different than the second musical composer, and the first musical score being different than the second musical score.

6. The apparatus for retrieving music according to claim 1, further comprising a music purchase accepting device for accepting a purchase of music made by the user from the music retrieved by said music retrieval device.

7. The apparatus for retrieving music according to claim 6, further comprising a reward point providing device for providing a predetermined number of reward points to a provider of at least one of the music selected, the selection of which is accepted by said music selection accepting device, the purchase of which is accepted by said music purchase accepting device.

8. The apparatus for retrieving music according to claim 7, wherein the reward point providing device is further arranged for calculating a sum of reward points provided to each music for a predetermined period of time and calculating a sum of money to be paid to the provider of the music selected according to the calculated sum of reward points.

9. The method of retrieving music according to claim 8, wherein the reward point providing device is further arranged for paying money to the provider of the music selected according to the predetermined number of reward points provided for the at least one of the music selected.

10. The apparatus for retrieving music according to claim 1, further comprising a music playing device for playing the music retrieved.

11. A method of retrieving music that matches with a preference of a user across a plurality of music, comprising:
a first step of generating feature vectors of said respective plurality of music;
a second step of clustering said plurality of music into a plurality of clusters according to the feature vectors generated in the first step;
a third step of extracting a predetermined number of music from each of said plurality of clusters;
a fourth step of accepting a selection of music by the user from the music extracted in the third step; and
a fifth step of calculating similarities between a feature vector of the music selected, the selection of which is accepted in the fourth step, and feature vectors of said respective plurality of music, and retrieving music that have higher similarities to said selected music among said plurality of music.

12. The method of retrieving music according to claim 11, further comprising another step of playing the music extracted by said music extraction device.

13. The method of retrieving music according to claim 11, further comprising:
- a sixth step of extracting music based on the calculated similarities, accepting a selection of music from the extracted music based on the calculated similarities, and retrieving music based on calculating similarities between a feature vector of the music selected from the extracted music based on the previously calculated similarities and feature vectors of said respective plurality of music.

14. The method for retrieving music according to claim 11, wherein the fifth step includes:
- (i) performing a set of cosine similarity operations defined by $$Sim(dk1, dk2) = \frac{dk1 \cdot dk2}{|dk1| \cdot |dk2|} \quad (1)$$

and
- (ii) retrieving music belonging to the respective plurality of music only when Sim(dk1,dk2) exceeds a predetermined value, where dk1 is the feature vector of the selected music and dk2 is the feature vector of each music belonging to the respective plurality of music.

15. The method for retrieving music according to claim 11, wherein the selected music is provided by a first musical composer in accordance with a first musical score; and
- wherein the fifth step includes retrieving music which is provided by a second musical composer in accordance with a second musical score, the first musical composer being different than the second musical composer, and the first musical score being different than the second musical score.

16. The method of retrieving music according to claim 11, further comprising:
- presenting a first list of music to the user between said third step of extracting and said fourth step of accepting;
- presenting a second list of music to the user after said fifth step of calculating similarities;
- accepting a selection of music by the user from the second list of music; and
- presenting a third list of music to the user, the third list of music including music that is more similar to the accepted selection of music from the second list than the music presented on the second list.

17. The method of retrieving music according to claim 16, further comprising presenting additional lists of music to the user, with each list presented being based on a user selection of music from a preceding list and being more similar to the selected music of the preceding list than the music presented in the preceeding list.

18. The method of retrieving music according to claim 16, further comprising, after presenting the user with a list of music based on a selection of music from a previous list, receiving a command from the user to present a new list of music unrelated to any previous selections of music.

19. The method of retrieving music according to claim 11, further comprising a sixth step of accepting a purchase of music made by the user from the music retrieved by said music retrieval device.

20. The method of retrieving music according to claim 19, further comprising a seventh step of providing a predetermined number of reward points to a provider of at least one of the music selected, the selection and acceptance of which occurred during the fourth step and the music, the purchase of which occurred during the sixth step.

21. The method of retrieving music according to claim 19, further comprising an eight step of calculating a sum of reward points provided to each music for a predetermined period of time and calculating a sum of money to be paid to the provider of the music selected according to the calculated sum of reward points.

22. The method of retrieving music according to claim 21, further comprising paying money to the provider of the music selected according to the predetermined number of reward points provided for the at least one of the music selected.

23. A computer program product having a non-transitory computer readable medium storing a program which, when executed by a computer, causes the computer to perform a method of retrieving music that matches with a preference of a user across a plurality of music, the method including:
- a first step of generating feature vectors of said respective plurality of music;
- a second step of clustering said plurality of music into a plurality of clusters according to the feature vectors generated in the first step;
- a third step of extracting a predetermined number of music from each of said plurality of clusters;
- a fourth step of accepting a selection of music by the user from the music extracted in the third step; and
- a fifth step of calculating similarities between a feature vector of the music selected, the selection of which is accepted in the fourth step, and feature vectors of said respective plurality of music, and retrieving music that have higher similarities to said selected music among said plurality of music.

24. The computer program product of claim 23, wherein the fifth step includes:
- (i) performing a set of cosine similarity operations defined by $$Sim(dk1, dk2) = \frac{dk1 \cdot dk2}{|dk1| \cdot |dk2|} \quad (1)$$

and
- (ii) retrieving music belonging to the respective plurality of music only when Sim(dk1,dk2) exceeds a predetermined value, where dk1 is the feature vector of the selected music and dk2 is the feature vector of each music belonging to the respective plurality of music.

25. The computer program product of claim 23, wherein the selected music is provided by a first musical composer in accordance with a first musical score; and
- wherein the fifth step includes retrieving music which is provided by a second musical composer in accordance with a second musical score, the first musical composer being different than the second musical composer, and the first musical score being different than the second musical score.

* * * * *